(12) United States Patent
Kikawa et al.

(10) Patent No.: US 8,330,097 B2
(45) Date of Patent: Dec. 11, 2012

(54) ANGULAR CORRECTION METHOD FOR ROTARY ENCODER

(75) Inventors: Hayami Kikawa, Kanagawa (JP); Satoshi Yanobe, Kanagawa (JP)

(73) Assignee: Sokkia Topcon Co., Ltd., Kanagawa (JP)

( * ) Notice: Subject to any disclaimer, the term of this patent is extended or adjusted under 35 U.S.C. 154(b) by 298 days.

(21) Appl. No.: 12/663,514

(22) PCT Filed: Oct. 17, 2007

(86) PCT No.: PCT/JP2007/070235
§ 371 (c)(1), (2), (4) Date: Dec. 7, 2009

(87) PCT Pub. No.: WO2008/152752
PCT Pub. Date: Dec. 18, 2008

(65) Prior Publication Data
US 2010/0181469 A1 Jul. 22, 2010
US 2012/0248300 A2 Oct. 4, 2012

(30) Foreign Application Priority Data
Jun. 15, 2007 (JP) .................................. 2007-158607

(51) Int. Cl.
G03D 3/02 (2006.01)
G01D 5/244 (2006.01)
G01D 5/36 (2006.01)

(52) U.S. Cl. ............................. 250/231.13; 250/231.14

(58) Field of Classification Search . 250/231.13–231.18
See application file for complete search history.

(56) References Cited

U.S. PATENT DOCUMENTS

| 5,922,036 A | 7/1999 | Yasui et al. |
| 6,630,659 B1 * | 10/2003 | Stridsberg ................. 250/231.13 |
| 7,108,424 B2 * | 9/2006 | Heumann et al. ............. 378/207 |
| 7,126,107 B2 * | 10/2006 | Ahne et al. ................. 250/231.13 |
| 7,126,109 B2 * | 10/2006 | Goldman et al. ........ 250/231.14 |
| 2003/0160160 A1 | 8/2003 | Taniguchi et al. |
| 2005/0274878 A1 * | 12/2005 | Goldman et al. ........ 250/231.13 |
| 2006/0262846 A1 * | 11/2006 | Burazerovic et al. ...... 375/240.2 |
| 2010/0181469 A1 * | 7/2010 | Kikawa et al. ........... 250/231.13 |

FOREIGN PATENT DOCUMENTS

| JP | 5-259548 A | 10/1993 |
| JP | 9-319872 A | 12/1997 |
| JP | 2002-13949 A | 1/2002 |
| JP | 2003-254785 A | 9/2003 |
| JP | 2005-24398 A | 1/2005 |

OTHER PUBLICATIONS

International Search Report for PCT/JP2007/070235 mailed Nov. 13, 2007.

* cited by examiner

*Primary Examiner* — John Lee
(74) *Attorney, Agent, or Firm* — Roberts Mlotkowski Safran & Cole P.C.

(57) ABSTRACT

An angular correction method is provided for a rotary encoder in which angular skip does not occur in determining an angle at a position of switching a combination of successive angular graduation images used in interpolation calculation. An angular correction quantity $C_i$ includes (1) a residual $r_i$ between a position computed from a model and an actually read position P, for each angular graduation image position and (2) a tangential slope $f'(x_i)$ of residual curve, $r=f(x)$, determined by fitting the residuals to a polynomial $f(x)$ which is a function of angular graduation image number x. The actually-read position P is corrected as $P+C_i$ to perform interpolation calculation determining an angle without angular skip.

7 Claims, 5 Drawing Sheets

Fig. 5

$$\begin{pmatrix} a_0 \\ a_1 \\ \vdots \\ a_{n-1} \\ a_n \end{pmatrix} = \begin{pmatrix} N & \sum x_i & \cdots & \sum x_i^n \\ \sum x_i & \sum x_i^2 & \cdots & \sum x_i^{n+1} \\ \vdots & \vdots & \ddots & \vdots \\ \sum x_i^{n-1} & \sum x_i^n & \cdots & \sum x_i^{2n-1} \\ \sum x_i^n & \sum x_i^{n+1} & \cdots & \sum x_i^{2n} \end{pmatrix}^{-1} \begin{pmatrix} \sum r_i \\ \sum r_i x_i \\ \vdots \\ \sum r_i x_i^{n-1} \\ \sum r_i x_i^n \end{pmatrix} \qquad (5)$$

In the above, $\sum$ expresses $\sum_{i=1}^{N}$.

Fig. 6

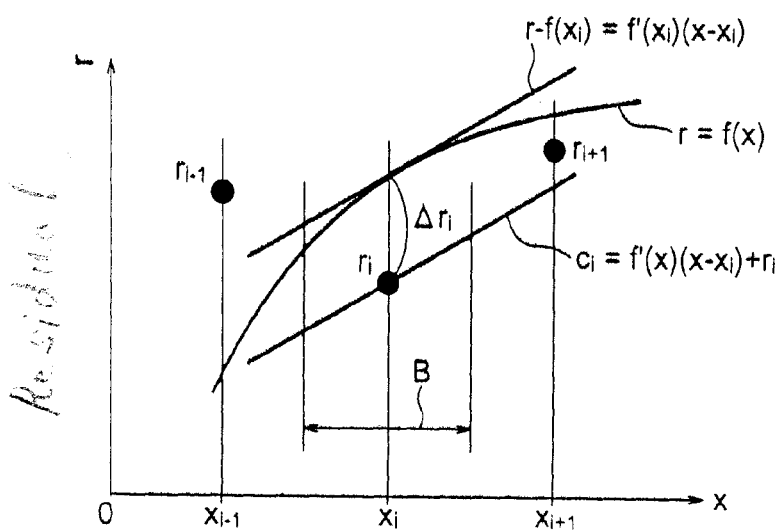

Coordinate position indicated by pixel number

ANGULAR CORRECTION METHOD FOR ROTARY ENCODER

TECHNICAL FIELD

The present invention relates to an angular correction method for a rotary encoder that is used in a surveying instrument.

BACKGROUND ART

A surveying instrument has a rotary encoder for measuring a horizontal angle and a vertical angle (see Patent Document 1 below). As shown in FIG. 1, the rotary encoder includes a dial 1 that rotates along with a telescope. Light from a light source 2 is illuminated onto angular graduations formed as slits 11 along a circumferential direction of the dial 1. Light that has passed through the slits 11 is received by a CCD linear sensor 3. An output of the CCD linear sensor 3 is sent to a CPU (arithmetic control unit) 6 via an A/D converter 5. The CPU 6 determines an angle based on positions (pixel coordinates) of slit images (angular graduation images) on the CCD linear sensor 3 and displays the angle on a display unit 7.

With a conventional rotary encoder used in a surveying instrument, an angle between slits 11 is determined by an interpolation calculation to achieve microscopic angular resolution. To perform the interpolation calculation, calculation is performed by fitting a plurality of successive slit images on the CCD linear sensor 3 to a model that has been determined in advance.

The model used in the interpolation calculation shall now be described. As shown in FIG. 2, in a plane view of the dial 1, R is a distance between a center O of the dial 1 and the CCD linear sensor 3, $P_0$ is a position (pixel number) of a foot of a perpendicular drawn from the center O of the dial 1 to the CCD linear sensor 3, and $A_0$ is an angle at this position $P_0$. Further, $P_i$ is a position (pixel number) of the i-th slit image among the successive slit images and $A_i$ is the angle of the i-th slit image, which is given as a dial graduation. The following formula holds for a triangle $P_iOP_0$, and this is used as the model of regression analysis for the interpolation calculation.

$$P_i = R \tan(A_i - A_0) + P_0 \quad (1)$$

Patent Document 1: Japanese Published Unexamined Patent Application No. 2002-13949

DISCLOSURE OF THE INVENTION

Problems to be Solved by the Invention

When $R'$, $A_0'$, and $P_0'$ are the most probable values of R, $A_0$, and $P_0$ determined by regression analysis using Formula (1), a positional residual $r_i$ of the i-th slit image among the successive slit images is expressed by the following formula:

$$r_i = R' \tan(A_i - A_0') + P_0' - P_i \quad (2)$$

Measurement data of the residual are shown in FIG. 3. An abscissa indicates a slit image number x and an ordinate indicates the residual $r_i$. With the rotary encoder, the interpolation calculation is performed using the plurality of successive slit images. In FIG. 3, besides a random variation, a systematic distortion is also occurring. When a distortion occurs in the residual $r_i$, a discontinuous angular error may occur when the slit images used in the interpolation calculation are switched. As the dial 1 is rotated, the slit images projected on the CCD linear sensor 3 move along the CCD linear sensor 3, and in the switching of the slit images, the slit images at both ends of the combination of successive slit images used for the interpolation calculation change according to the rotation of the dial 1. That is, of the combination made up of slit images, a slit image at an end at one side falls out and does not become used in the interpolation calculation, and a single slit image enters at the other end and becomes used in the interpolation calculation. Such falling out of the single slit image at one end and entering of the single slit image at the other end from and into the combination of the slit images used in the interpolation calculation is referred to as the switching of the slit image. Conventionally, when this occurs, because a region of the CCD linear sensor 3 occupied by the slit images used in the interpolation calculation changes discontinuously by an amount corresponding to a single slit image section, a discontinuity of the measured angle value of approximately 0.2 to 0.3 seconds, referred to as "angular skip," occurs.

The present invention has been made in view of the above problem, and an object thereof is to provide an angular correction method with which angular skip does not occur even when a dial of a rotary encoder rotates and switching of slit images occurs in the combination of a plurality of slit images used in an interpolation calculation.

Means for Solving the Problems

To achieve the above object, a first aspect of the present invention provides an angular correction method for a rotary encoder that includes: a dial, having angular graduations formed therein; a detector, reading angular graduation image positions of light transmitted through the angular graduations; and a computing unit, obtaining a measured angle value by interpolation calculation from the angular graduation image positions; the angular correction method including: a residual curve determining step of determining and recording a residual r between a position computed from a model and an actually read position P, for each angular graduation image position, and of fitting the residuals r to a polynomial f(x), which is a function of angular graduation image number x, whose order is set in advance, to determine a residual curve, r=f(x); a slope computing step of computing a tangential slope $f'(x_i)$ of the residual curve at a point $x=x_i$, with $x_i$ being an i-th angular graduation image number; and an angular correction data recording step of recording the i-th residual $r_i$ and the slope $f'(x_i)$.

A second aspect of the present invention provides an angular correction method for a rotary encoder that includes: a dial, having angular graduations formed therein; a detector, reading angular graduation image positions of light transmitted through the angular graduations; and a computing unit, obtaining a measured angle value by interpolation calculation from the angular graduation image positions; the angular correction method including: a residual curve determining step of determining and recording a residual r between a position computed from a model and an actually read position P, for each angular graduation image position, and of fitting the residuals r to polynomials f(x), which are functions of angular graduation image number x, whose respective orders are no less than the 0-th to determine residual curves, r=f(x); a slope computing step of computing, for the polynomial of each order, a tangential slope $f'(x_i)$ of the residual curve at a point $x=x_i$, with $x_i$ being the i-th angular graduation image number among a plurality of successive angular graduation images; an angular skip computing step of computing an angular graduation image position correction quantity $C_i$ for the polynomial of each order, from a residual $r_i$ of the i-th angular graduation image number and the slope $f'(x_i)$, of determining a measured angle value $\theta_0$ using the correction quantity $C_i$, of switching the combination of successive angular graduation images used in the interpolation calculation respectively in a direction in which the angular graduation decreases and in a direction in which the angular graduation increases to determine measured angle values $\theta_{-1}$ and $\theta_{+1}$ by using the correction quantity $C_i$, and of computing angular skip quantities from differences in angle value, $\theta_{-1}-\theta_0$ and $\theta_{+1}-\theta_0$, between the measured angle value $\theta_0$ and the measured angle values $\theta_{-1}$ and $\theta_{+1}$; an order determining step of comparing the angular skip quantities that have been computed according to the polynomials of the respective orders to determine the order of the polynomial $f(x)$; and an angular correction data recording step of recording the residual $r_i$ and the tangential slope $f'(x_i)$ obtained from the polynomial $f(x)$ of the determined order.

A third aspect of the present invention provides the angular correction method according to the second aspect of the present invention where the order of the polynomial is in a range of 0th to 7th orders.

A fourth aspect of the present invention provides the angular correction method according to the third aspect of the present invention where the order of the polynomial is determined so as to minimize an Akaike information criterion (AIC).

A fifth aspect of the present invention provides the angular correction method according to the fourth aspect of the present invention where the order of the polynomial is determined so that the polynomial is of the lowest order.

A sixth aspect of the present invention provides a rotary encoder including: a dial, having angular graduations formed therein; a detector, reading angular graduation image positions of light transmitted through the angular graduations; and a computing unit, obtaining a measured angle value by interpolation calculation from the angular graduation image positions; and where the computing unit corrects the measured angle value by using the residual $r_i$ and the tangential slope $f'(x_i)$ prepared and recorded by the angular correction method according to the first, second, third, fourth, or fifth aspect.

Effect(s) of the Invention

With the first aspect of the present invention, because the residual curve of the predetermined order with which angular skip is least likely to occur is determined and the residual r and the tangential slope $f'(x)$ of the residual curve are memorized as the angular correction data, a measured angle value correction quantity for which the angular skip is extremely small can be computed and a highly precise measured angle value can be obtained with a surveying instrument in which the angular correction data are memorized.

With the second aspect of the present invention, because the residual curve of the order with which angular skip is least likely to occur is determined from among the residual curves, $r=f(x)$, that are polynomials of respective orders of no less than the 0-th order and the residual r and the tangential slope $f'(x)$ of the residual curve are memorized as the angular correction data, a measured angle value correction quantity for which the angular skip is extremely small can be computed and a more highly precise measured angle value than that which can be obtained by the first aspect of the present invention can be obtained with a surveying instrument in which the angular correction data are memorized.

With the third aspect of the present invention, because the angular correction data are prepared by determining the residual curve of the most appropriate order upon restricting the orders of the polynomials of the residual curves, $r=f(x)$, in the range of the 0th to 7th orders, the angular correction data can be prepared more rapidly.

With the fourth aspect of the present invention, because the order of the polynomial of the residual curve, $r=f(x)$, is determined to minimize the AIC, the most appropriate polynomial order is selected and an even more precise measured angle value can be obtained.

With the fifth aspect of the present invention, because the order of the polynomial of the residual curve, $r=f(x)$, is determined to be the lowest order, more stable angular correction data can be prepared.

With the sixth aspect of the present invention, because the residual $r_i$ and the tangential slope $f'(x_i)$ of the residual curve, $r=f(x)$, are recorded by the angular correction method according to the first, second, third, fourth, or fifth aspect as the angular correction data in the surveying instrument, a highly precise rotary encoder with which the angular skip is made extremely small by the use of the angular correction data is provided.

BEST MODES FOR CARRYING OUT THE INVENTION

An embodiment of the present invention shall now be described in detail based on the drawings. FIG. 1 is a block diagram of a rotary encoder according to the present invention. FIG. 2 is a diagram for describing a model of regression analysis used for interpolation calculation in angle measurement by the rotary encoder. FIG. 3 is a diagram of a measurement example of residuals, which are given as differences between actually read positions and the positions computed from the model shown in FIG. 2 though regression analysis by using a plurality of successive slit images, of respective slit images. FIG. 4 is a diagram for describing a residual curve, $r=f(x)$. FIG. 5 is a formula for computing respective coefficients and a constant of the $f(x)$. FIG. 6 is a diagram for describing a method for computing a correction quantity in the interpolation calculation. FIG. 7 is also a diagram for describing a method for computing a correction quantity in the interpolation calculation. FIG. 8 is a flowchart for describing a procedure for preparing angular correction data used in the interpolation calculation.

The configuration of the rotary encoder according to the present embodiment is the same as the conventional rotary encoder shown in FIG. 1. The rotary encoder according to present embodiment includes a dial 1, slits 11, which are angular graduations formed along a peripheral edge of the dial 1, a light source 2, illuminating the slits 11, a CCD linear sensor 3, reading the projected images of the slits 11, an A/D converter 5, converting an output signal from the CCD linear sensor 3 to a digital signal, a CPU (computing unit) 6, computing an angle from an output signal of the A/D converter, and a display unit 7, displaying the computed angle.

However, with the rotary encoder according to the present embodiment, angular skip can be made less likely to occur in the interpolation calculation in the angle measurement by the CPU 6. A method for computing the correction quantity by which the angular skip can be made less likely to occur in the present rotary encoder shall now be described in detail.

First, by Formula (2), described above, a residual $r_i$ of the i-th slit image among the plurality of successive slit images is determined. FIG. 3 shows the residuals r of the slit images used in the interpolation calculation. The abscissa of the figure indicates a slit image number x and the ordinate indicates the residual r. With the slit image numbers x, an integer value is allocated successively from an end at one side to the successive slit images used in the interpolation calculation. That is, successive numbers are assigned in a manner such that the slit image number of the slit image at the end at one side is 1, the slit image number of an adjacent slit image is 2, and the slit image number of a next adjacent slit image is 3. A characteristic of the residuals r in FIG. 3 is that the residuals depend more on optical distortions of the light sending system and the light receiving system than on randomness in position among individual slits. That is, regardless of which positions of the dial 1 are projected on the CCD linear sensor 3, the magnitudes of the residuals r are substantially the same in magnitude at the respective positions of the CCD linear sensor 3 and as to which slits of the dial 1 are being detected is not so relevant. In other words, the shape of the residuals r of FIG. 3 does not vary and is maintained even if the dial 1 rotates.

A relationship between the slit image numbers x and the residuals r is shown in FIG. 4. The residual curve, $r=f(x)$, is determined. As $f(x)$, an n-th order polynomial, such as the following, is considered.

$$f(x)=a_n x^n + a_{n-1} x^{n-1} + \ldots + a_1 x + a_0 \quad (3)$$

The residuals r at the slit image numbers x are fitted to the form of the polynomial, $f(x)$. If the number of slit images used in the interpolation calculation is N, the slit image numbers x are such that the slit image number of the slit image at the end at one side that is the side of lower angular graduation is $x_1$, that of the adjacent slit image is $x_2$, that of the next adjacent slit image is $x_3$, and so that as a whole, there are the slit image numbers $x_1$ to $x_N$. With respect to the N slit images from $x_1$ to $x_N$, slit images at both ends of the range of the slit images used in the interpolation calculation are added with the slit image number thereof being $x_0$ and $x_{N+1}$ and 0 and N+1 being allotted as specific numerical values. The slit image numbers x are thus as follows:

$$x_i = (x_0, x_1, x_2, \ldots, x_i, \ldots, x_N, x_{N+1}) = (0, 1, 2, \ldots, i, \ldots, N, N+1) \quad (4)$$

The residuals $r_0$ and $r_{N+1}$ of the slit images indicated by the slit image numbers $x_0$ and $x_{N+1}$ are determined by Formula (2). The respective coefficients can be calculated from Formula (5), shown in FIG. 5. However, it should be noted that the calculation using Formula (5) is performed using just the N slit images used in the interpolation calculation and the slit images at both sides of the range are not used.

Although it may be possible to correct the angular skip using $f(x)$ thus determined, the present form is not yet in a preferable form from a standpoint of performing correction of high reliability. The residual curve, $r=f(x)$, generally does not pass through the measured residual points $(x_i, r_i)$ and is thus not adequate in precision, and to correct the angular skip with higher precision, the following is performed.

As shown in FIG. 6, a tangent to the residual curve, $r=f(x)$, at the point, $x=x_i$, is determined as in the following formula:

$$r - f(x_i) = f'(x_i)(x - x_i) \quad (6)$$

In the above, $f'(x) = df(x)/dx$, and a tangential slope $f'(x)$ is expressed by the following formula:

$$f'(x) = n a_n x^{n-1} + (n-1) a_{n-1} x^{n-2} + \ldots + a_1 \quad (7)$$

In general, the tangent expressed by Formula (6) does not pass through the point, $(x_i, r_i)$. A difference $\Delta r_i$ between $f(x_i)$ and $r_i$ is expressed by the following formula:

$$\Delta r_i = r_i - f(x_i) \quad (8)$$

When a large distortion occurs in detected slit images due to attachment of debris on the CCD linear sensor 3 or on slits 11 of the dial 1, etc., these slit images are not used in the interpolation calculation and the interpolation calculation is performed using the other slit images that are not distorted. When a slit image, with which an absolute value of $\Delta r_i$, given by Formula (8), takes on a large numerical value, is distorted greatly by debris, etc., and is eliminated from use in the interpolation calculation, an angle error due to the difference, $\Delta r_i$, is generated.

Thus, a correction quantity $C_i$ for a slit image position $P_i$ of the i-th slit image number $x_i$ is determined by the following formula:

$$C_i = f'(x_i)(x - x_i) + r_i \quad (9)$$

A correction range B for the i-th slit image number $x_i$ is the range given by the following formula:

$$x_i - 0.5 < x \leq x_i + 0.5 \quad (10)$$

The following formula is obtained from the Formula (10):

$$-0.5 < x - x_i \leq 0.5 \quad (12)$$

By substituting the following Formula (13) into the Formula (12), Formula (14), shown below, is obtained:

$$x = x_i + X \quad (13)$$

$$-0.5 < X \leq 0.5 \quad (14)$$

When X is used, the Formula (9) becomes as follows:

$$C_i = f'(x_i) X + r_i \quad (15)$$

A method for determining X shall now be described. The combination of slit images made up of the plurality of successive slit images used in the interpolation calculation is determined by two slit image positions, $P_k$ and $P_{k+1}$ (positions using the pixel number as a coordinate, that is, CCD pixel number coordinates) that sandwich a foot, $P_0$, of a perpendicular drawn from the center O of the dial 1 to the CCD linear sensor 3. A relationship among $P_0$, $P_k$, and $P_{k+1}$ is shown in FIG. 7. Here, it shall be deemed that the CCD pixel number coordinate indicated by the slit image of the slit image position $P_k$ takes on a smaller coordinate value than the CCD pixel number coordinate indicated by the slit image of the slit image position $P_{k+1}$. In this case, N/2 slit images, at the side of smaller CCD pixel number coordinate from the slit image corresponding to $P_k$ and including this slit image, are used in the interpolation calculation and N−N/2 slit images, at the side of larger CCD pixel number coordinate from the slit image corresponding to $P_{k+1}$ and including this slit image, are used in the interpolation calculation. Based on the above, X is determined by the following formula:

$$X = (P_{k+1} - P_0)/(P_{k+1} - P_k) - 0.5 \quad (16)$$

When X increases, the slit images move in a relative manner toward larger CCD pixel number coordinates of the CCD linear sensor 3 with respect to $P_0$. By substituting Formula (16) into Formula (15), the following formula is obtained:

$$C_i = f'(x_i)\{(P_{k+1} - P_0)/(P_{k+1} - P_k) - 0.5\} + r_i \quad (17)$$

To perform angular skip correction, when the most probable values of $P_0$, $A_0$, and R of Formula (1) are determined by regression analysis, the correction quantity $C_i$, shown in Formula (17), is computed by using $f'(x_i)$ and $r_i$ which are determined and recorded in advance as angular correction data, and by using a value calculating $(P_{k+1} - P_0)/(P_{k+1} - P_k)$ during the measurement. The correction quantity $C_i$ is added to the i-th slit image position $P_i$ of the slit image used in the interpolation calculation as calculating $P_i + C_i$. Then this value $P_i + C_i$ is used as the new slit image position to perform regression analysis determining the most probable values of $P_0$, $A_0$, and R of Formula (1) and computing the angle.

The order of the polynomial f(x) of the residual curve, r=f(x), determined from Formula (4) and Formula (5) is not determined in advance, and each encoder unit is made to select an optimal order. However, the range up to the maximum order is restricted from the 0th to 7th orders. This is because it was found from several experiments that orders up to the maximum of the 7th order suffice.

A procedure for preparing the angular correction data shall now be described using the flowchart of FIG. 8. First, in step S1, the residual $r_i$ is measured and memorized for each slit image among the N successive slit images used in the interpolation calculation. Next, step S2 is entered and data of the residuals $r_i$ are fitted to the residual curve, r=f(x), that is the n-th order polynomial f(x) and the respective coefficients $a_n$ to $a_1$ and the constant $a_0$ of f(x) are computed. However, at the start, the order of f(x) is the 0th order.

Step S3 is then entered and the AIC (Akaike information criterion), which is generally used as a guideline for model selection, is computed. In a case where variance is unknown, the AIC is calculated by the following formula:

$$AIC = N \cdot \ln S + 2M \quad (23)$$

In the above, S is a sum of squared residuals of the residuals ε between the n-th order polynomial, determined by the fitting calculation, and the residuals r used in the calculation of the polynomial. N is the number of data. M is the number of parameter and with the n-th order polynomial of Formula (3), M=n+1. The AIC expresses a degree of poorness of the model obtained, and the greater the numerical value thereof, the poorer the model.

Step S4 is then entered, and the tangential slope $f'(x_i)$ of the residual curve, r=f(x), at the point, $x=x_i$ (the i-th slit image number among the slit images used in the interpolation calculation plus the slit images at both ends of the range), is computed and memorized.

Step S5 is then entered, and using the memorized residual r and the tangential slope f'(x), the correction quantity $C_i$ of the i-th slit image position $P_i$ is computed. Using the correction quantity $C_i$, the slit image position $P_i$ is corrected as $P_i+C_i$ to perform regression analysis of the form of Formula (1) and the angle $\theta_0$ is determined. The combination of N-successive slit images used in the interpolation calculation is switched by one image to a forward side (to the side toward which the angular graduation decreases or the side toward which the pixel number decreases) and then by one image to a backward side (to the side toward which the angular graduation increases or the side toward which the pixel number increases) and using the correction quantity $C_i$ to correct the slit image position $P_i$ as $P_i+C_i$ in each case, the angles $\theta_{-1}$ and $\theta_{+1}$ are determined. From absolute values, $|\theta_{-1}-\theta_0|$ and $|\theta_{+1}-\theta_0|$, of magnitudes of the changes from the angle $\theta_0$ before switching the slit image combination to the angles $\theta_{-1}$ and $\theta_{+1}$ after switching the slit image combination, the respective angular skip quantities are computed and memorized.

Step S6 is then entered and it is checked whether or not the respective angular skip quantities have been computed for all polynomials f(x) from the 0th order polynomial to the 7th order polynomial. If there is an order n for which computation has not been performed, step S1 is returned to and steps S1 to S5 are repeated. If the angular skip quantities have been computed for all polynomials f(x) from the 0th order polynomial to the 7th order polynomial, step S7 is entered.

When step S7 is entered, the angular skip quantities before and after switching of the slit image combination of the respective polynomials f(x) that were memorized in step S5 are compared to determine the order of the polynomial f(x) for which angular skip is least likely to occur, that is, the order of the polynomial f(x) for which the frequency at which the angular skip quantity is the minimum is maximized is determined to determine the order of f(x). However, when a plurality of such orders exist, the order is determined as that for which the AIC, indicated by Formula (23), is minimized. If polynomial orders are also equivalent in terms of AIC, the lowest order among such orders is determined as the order of f(x).

Step S8 is then entered and the tangential slope f'(x) of f(x) of the order determined in step S7 is recorded along with the residual r as the angular correction data.

The residual r and the tangential slope f'(x), which are the angular correction data recorded in step S8, can then be used in subsequent measurements to perform interpolation calculation of small angular skip. Although in the present embodiment, the residual r used in the angular correction data preparation was determined from a slit image detected in a single reading by the CCD linear sensor 3, more precise angular correction data may be prepared by detecting slit images at a plurality of locations of the dial 1 by rotating the dial 1 by a fixed angle at a time. The residual r is determined for each location and an average residual e is also determined by averaging the residuals r at the respective slit image positions. Then the average residual e is applied to the present embodiment to prepare the angular correction data.

As is clear from the above description, the following effects are provided by the rotary encoder according to the present embodiment. Because the residual curve, r=f(x), of the order, among the 0th to 7th orders, for which angular skip is least likely to occur, is determined and the residual $r_i$ and the tangential slope $f'(x_i)$ of the residual curve, r=f(x), are memorized as angular correction data, a measured angle value of small angular skip can be obtained rapidly at high precision by computing the correction quantity $C_i$ using the angular correction data. Further, because the order of the polynomial f(x) of the residual curve, r=f(x), is determined so that the AIC is minimized and so that the order is the minimum order, correction data that is even more precise and stable can be prepared.

Further, because the correction quantity $C_i$ passes through the measured residual value point $(x_i, r_i)$, even if a slit image is distorted due to debris, etc., and not used in the interpolation calculation, hardly any angular error occurs. Also, because the correction quantity $C_i$ is a first order equation, integer computation in a program is enabled, thereby enabling a processing load to be kept low and a high processing speed to be realized.

BRIEF DESCRIPTION OF THE DRAWINGS

FIG. 5 is a formula for computing respective coefficients and a constant of the f(x).

FIG. 6 is a diagram for describing a method for computing a correction quantity in the interpolation calculation.

Figure 1:
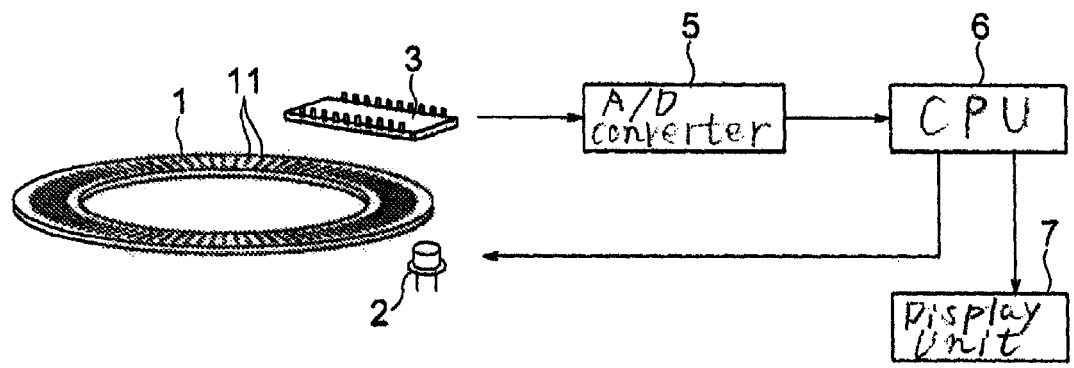
FIG. 1 is a block diagram of a rotary encoder according to the present invention.
Figure 2:
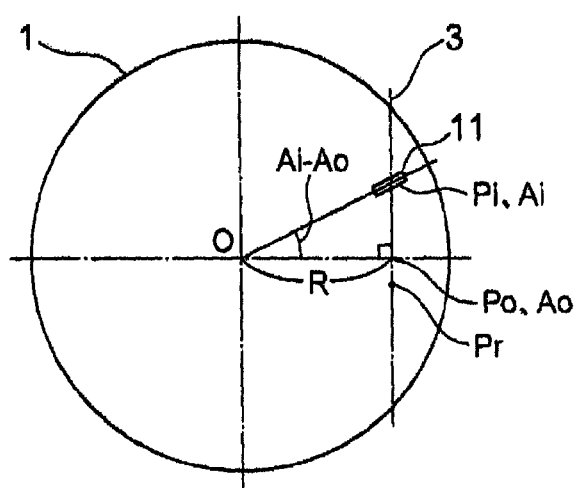
FIG. 2 is a diagram for describing a model used for interpolation calculation in angle measurement by the rotary encoder.
Figure 3:
FIG. 3 is a diagram of a measurement example of residuals of measurement values obtained by the model.
Figure 4:
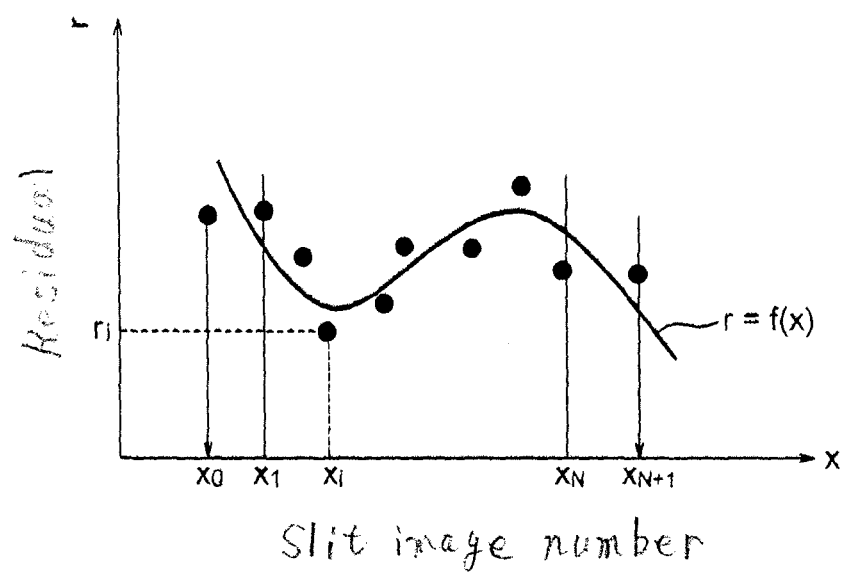
FIG. 4 is a diagram for describing a residual curve, r=f(x).
Figure 7:
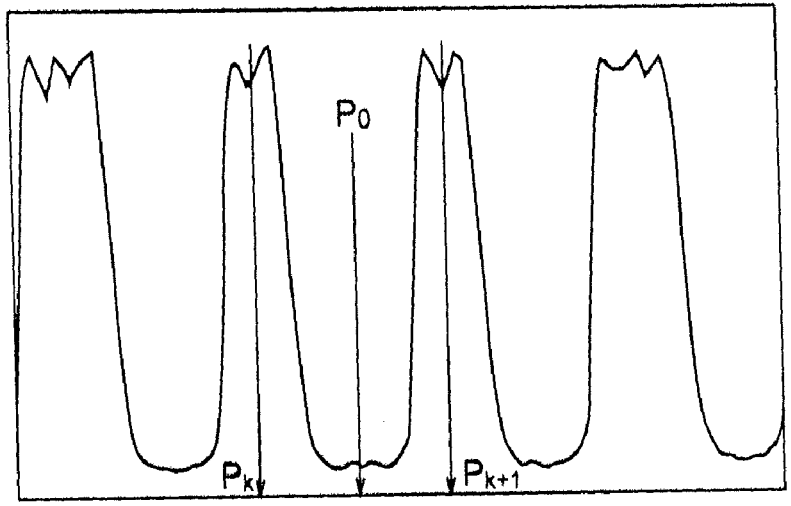
FIG. 7 is a diagram for describing a method for computing a correction quantity in the interpolation calculation.
Figure 8:
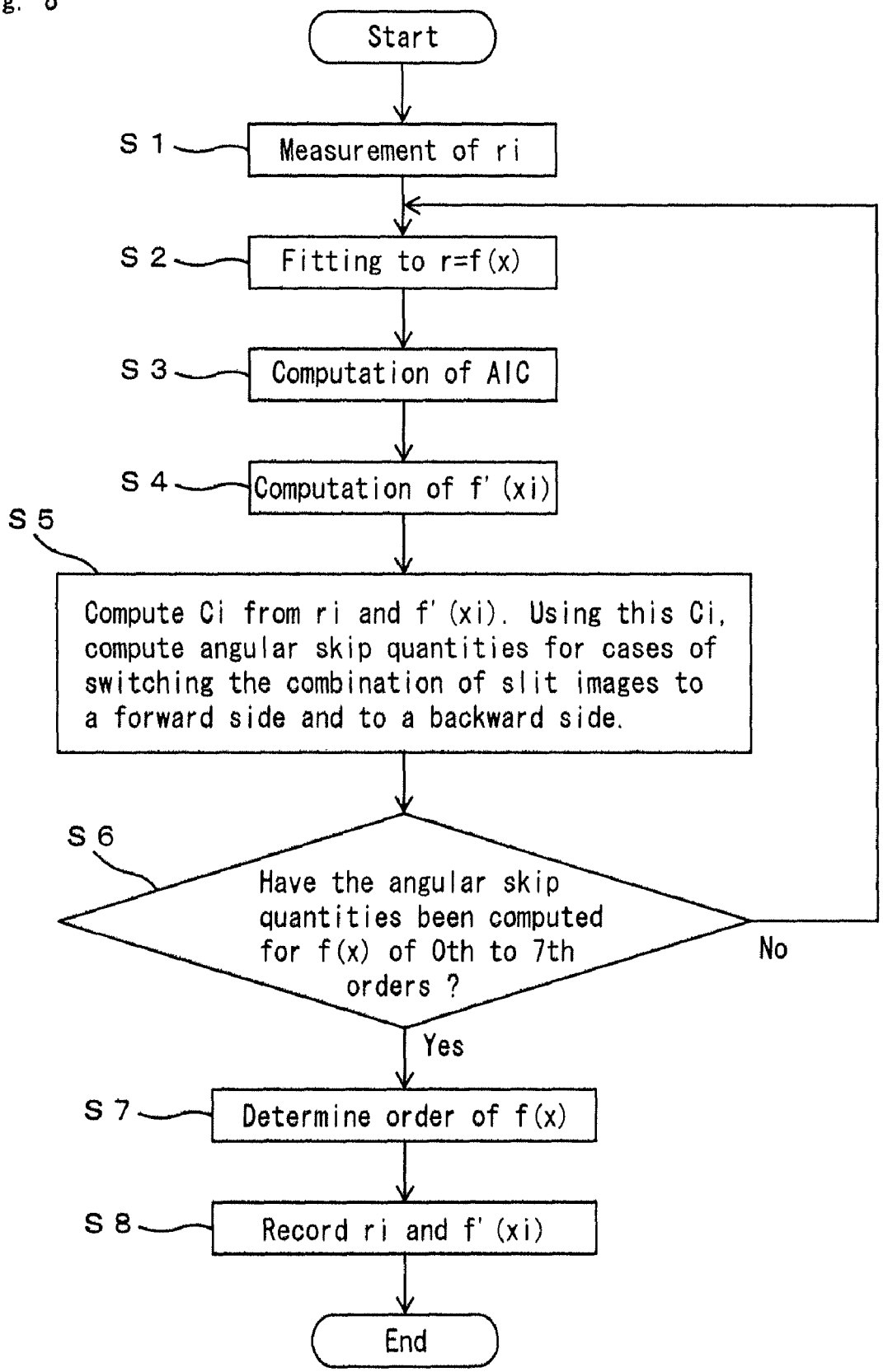
FIG. 8 is a flow diagram for describing a procedure for acquiring angular correction data used in the interpolation calculation.

DESCRIPTION OF THE REFERENCE NUMERALS 1 dial
2 light source
3 CCD linear sensor (detector)
6 arithmetic control unit (CPU)
11 slit (angular graduation)
$C_i$ correction quantity
$f(x)$ polynomial
$f'(x)$, $f'(x_i)$ tangential slope of polynomial (angular correction data)
P, $P_i$ slit image position (angular graduation image position)
r, $r_i$ residual (angular correction data)
x, $x_i$ slit image number

The invention claimed is:

1. An angular correction method for a rotary encoder that includes:
   a dial having angular graduation slits formed therein;
   a detector, reading angular graduation slit image positions of light transmitted through the angular graduation slits, and
   a computing unit, obtaining a measured angle value by interpolation calculation from the angular graduation slit image positions, the angular correction method comprising:
   a step of determining the most probable values $R'$, $A_0'$, and $P_0'$ of R, $A_0$, and $P_0$, respectively, by regression analysis of $P_i$'s and $A_i$'s for the angular gradation slit image positions, based on a formula which is derived from a model used in the interpolation calculation that holds for a triangle $P_i O P_0$ $$P_i = R \tan(A_i - A_o) + P_o$$

where
   $P_i$ is the position (pixel number) of the i-th angular gradation slit image among successive angular gradation slit images,
   $P_0$ is the position (pixel number) of a foot of a perpendicular drawn from a center 0 of the dial (1) to the detector derived from the model used in the interpolation calculation,
   R is a distance between the center 0 of the dial and the detector,
   $A_0$ is the angle of position $P_0$,
   $A_i$ is the angle of i-th angular gradation slit image,
   and of calculating residual $r_i$ for the i-th angular gradation slit image position defined by $$r_i = R' \tan(A_i - A_0') + P_0' - P_i;$$

a residual curve determining step of determining and recording a residual r between a position computed from the formula $P_i = R \tan(A_i - A_o) + P_o$ and an actually read position P, for each angular graduation slit image position and of fitting the residuals r to a polynomial $f(x)$ which is a function of angular graduation slit image number x, whose order is set in advance, to determine a residual curve, $r = f(x)$;
   a slope computing step of computing a tangential slope $f'(x_i)$ of the residual curve at a point $x = x_i$, with $x_i$ being the i-th angular graduation slit image number; and
   a step of calculating the value of $(P_{k+1} - P_0)/(P_{k+1} - P_k)$ during measurement, where $P_{k+1}$ and $P_k$ are positions of two angular graduation slit images sandwiching the foot, Po, of the perpendicular drawn from the center 0 of the dial to the detector derived from the model used in the interpolation calculation,
   a step of calculating a correction quantity $C_i$ defined by $$C_i = f'(x_i)\{(P_{k+1} - P_0)/(P_{k+1} - P_k) - 0.5\} + r_i$$

and calculating $(P_i + C_i)$ for each of the angular graduation slit image positions; and
   a step of performing the regression analysis using $(P_i + C_i)$ as the new angular graduation slit image position for the i-th image to compute the measured angle value by interpolation calculation.

2. An angular correction method for a rotary encoder that includes:
   a dial having angular graduation slits formed therein;
   a detector, reading angular graduation slit image positions of light transmitted through the angular graduation slits; and
   a computing unit obtaining a measured angle value by interpolation calculation from the angular graduation slit image positions, the angular correction method comprising:
   a step of determining the most probable values $R'$, $A_0'$, and $P_0'$ of R, $A_0$, and $P_0$, respectively, by regression analysis of $P_i$'s and $A_i$'s for the angular gradation slit image positions, based on a formula which is derived from a model used in the interpolation calculation that holds for a triangle $P_i O P_0$ $$P_i = R \tan(A_i - A_o) + P_o$$

where
   $P_i$ is the position (pixel number) of the i-th angular gradation slit image among successive angular gradation slit images,
   $P_0$ is the position (pixel number) of a foot of a perpendicular drawn from a center 0 of the dial to the detector derived from a model used in the interpolation calculation,
   R is a distance between the center 0 of the dial and the detector,
   $A_0$ is the angle of position $P_0$,
   $A_i$ is the angle of i-th angular gradation slit image,
   and of calculating residual $r_i$ for the i-th angular gradation slit image position defined by $$r_i = R' \tan(A_i - A_0') + P_0' - P_i;$$

a residual curve determining step of determining and recording a residual r between a position computed from the model formula $P_i = R \tan(A_i - A_o) + P_o$ and an actually read position P, for each angular graduation slit image position and of fitting the residuals r to a polynomial $f(x)$ which is a function of angular graduation slit image number x, whose order is set in advance, to determine a residual curve, $r = f(x)$;
   a slope computing step of computing, for the polynomial of each order, a tangential slope $f'(x_i)$ of the residual curve at a point $x = x_i$, with $x_i$ being the i-th angular graduation slit image number among a plurality of successive angular graduation slit images;
   an angular skip computing step of computing an angular graduation slit image position correction quantity $C_i$ from a residual $r_i$ of the i-th angular graduation image number and the slope $f'(x_i)$ for the polynomial of each order, of determining a measured angle value $\theta_0$ by using the correction quantity $C_i$, of switching the combination of successive angular graduation slit images used in the interpolation calculation respectively in a direction in which the angular graduation decreases and of in a direction in which the angular graduation increases to determine measured angle values $\theta_{-1}$ and $\theta_{+1}$ using the correction quantity $C_i$ and computing angular skip quantities from differences in angle value, $\theta_{-1}-\theta_0$ and $\theta_{+1}-\theta_0$, between the measured angle value $\theta_0$ and the measured angle values $\theta_{-1}$ and $\theta_{+1}$;

an order determining step of comparing the angular skip quantities that have been computed according to the polynomials of the respective orders to determine the order of the polynomial f(x); and an angular correction data recording step of recording the i-th residual $r_i$ and the tangential slope $f'(x_i)$ obtained from the polynomial f(x) and, a step of calculating the value of $(P_{k+1}-P_0)/(P_{k+1}-P_k)$ during measurement, where $P_{k+1}$ and $P_k$ are positions of two angular graduation slit images sandwiching the foot, $P_0$, of the perpendicular drawn from the center 0 of the dial to the detector;

a step of calculating a correction $C_i$ defined by $$C_i = f'(x_i)\{(P_{k+1}-P_0)/(P_{k+1}-P_k)-0.5\}+r_i$$

and calculating $(P_i+C_i)$ for each of the angular graduation slit image positions; and a step of performing the regression analysis using $(P_i+C_i)$ as the new angular graduation slit image position for the i-th image to compute the measured angle value by interpolation calculation.

3. The angular correction method for a rotary encoder according to claim 2, wherein the order of the polynomial is in a range of 0th to 7th orders.

4. The angular correction method for a rotary encoder according to claim 3, wherein the order of the polynomial is determined so as to minimize an Akaike information criterion (AIC).

5. The angular correction method for a rotary encoder according to claim 4, wherein the order of the polynomial is determined so that the polynomial is of the lowest order.

6. A rotary encoder comprising: a dial, having angular graduations formed therein; a detector, reading angular graduation image positions of light transmitted through the angular graduation; and a computing unit, obtaining a measured angle value by interpolation calculation from the angular graduation image positions, wherein the computing unit corrects the measured angle value by using the residual $r_i$ and the tangential slope $f'(x_i)$ prepared and recorded by the angular correction method according to claim 1.

7. An angular correction method for a rotary encoder having:

a dial with angular graduations formed therein;

a detector that reads angular graduation slit image positions of light transmitted through the angular gradations of the dial, and a computing unit that obtains a measured angle value by interpolation calculation from the angular graduation slit image positions, wherein the angular correction method comprises:

determining a residual curve by recording a residual r between a position computed from a formula $P_i=R \tan(A_i-A_o)+P_o$ and an actually-read position P for each angular graduation slit image position, and fitting the residuals r to polynomials f(x) which are functions of angular graduation image number x and whose respective orders are no less than the 0-th, such that residual curves, r=f(x) are determined, where $P_i$ is the position (pixel number) of the i-th angular gradation slit image among successive angular gradation slit images, $P_0$ is the position (pixel number) of a foot of a perpendicular drawn from a center 0 of the dial (1) to the detector derived from the model used in the interpolation calculation, R is a distance between the center 0 of the dial and the detector, $A_0$ is the angle of position $P_0$, and $A_i$ is the angle of an i-th angular gradation slit image;

a slope computing step of computing, for the polynomial of each order, a tangential slope $f'(x_i)$ of the residual curve at a point $x=x_i$, with $x_i$ being the i-th angular graduation slit image number among a plurality of successive angular graduation slit images;

an angular skip computing step of computing an angular graduation slit image position correction quantity $C_i$ from a residual $r_i$ of the i-th angular graduation slit image number and the slope $f'(x_i)$ for the polynomial of each order, of determining a measured angle value $\theta_0$ by using the correction quantity $C_i$, of switching the combination of successive angular graduation slit images used in the interpolation calculation respectively in a direction in which the angular graduation decreases and of in a direction in which the angular graduation increases to determine measured angle values $\theta_{-1}$ and $\theta_{+1}$ using the correction quantity $C_i$, and computing angular skip quantities from differences in angle value, $\theta_{-1}-\theta_0$ and $\theta_{+1}-\theta_0$, between the measured angle value $\theta_0$ and the measured angle values $\theta_{-1}$ and $\theta_{+1}$;

an order determining step of comparing the angular skip quantities that have been computed according to the polynomials of the respective orders to determine the order of the polynomial f(x); and an angular correction data recording step of recording the i-th residual $r_i$ and the tangential slope $f'(x_i)$ obtained from the polynomial f(x) and, a step of calculating the value of $(P_{k+1}-P_0)/(P_{k+1}-P_k)$ during measurement, where $P_{k+1}$ and $P_k$ are positions of two angular graduation slit images sandwiching a foot, $P_0$, of the perpendicular drawn from the center 0 of the dial to the detector derived from the model used in the interpolation calculation;

a step of calculating a correction $C_i$ defined by $$C_i = f'(x_i)\{(P_{k+1}-P_0)/(P_{k+1}-P_k)-0.5\}+r_i$$

and calculating $(P_i+C_i)$ for each of the angular graduation slit image positions; and a step of performing the regression analysis using $(P_i+C_i)$ as the new angular graduation slit image position for the i-th image to compute the measured angle value by interpolation calculation.

* * * * *